(12) United States Patent
Sakurai et al.

(10) Patent No.: US 8,017,711 B2
(45) Date of Patent: Sep. 13, 2011

(54) RESIN ARTICLE AND PROCESS FOR PRODUCING THE SAME

(75) Inventors: Takashi Sakurai, Sodegaura (JP); Hideki Oshima, Bartlesville, OK (US)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/307,956

(22) PCT Filed: Jul. 10, 2007

(86) PCT No.: PCT/JP2007/064046
§ 371 (c)(1),
(2), (4) Date: Apr. 16, 2009

(87) PCT Pub. No.: WO2008/007795
PCT Pub. Date: Jan. 17, 2008

(65) Prior Publication Data
US 2009/0215975 A1    Aug. 27, 2009

(30) Foreign Application Priority Data
Jul. 10, 2006   (JP) ................. 2006-189006

(51) Int. Cl.
*C08F 110/06* (2006.01)
*C08L 23/00* (2006.01)

(52) U.S. Cl. ........................ 526/351; 525/240
(58) Field of Classification Search ............. 526/351
See application file for complete search history.

(56) References Cited

U.S. PATENT DOCUMENTS
4,985,495 A * 1/1991 Nishio et al. .............. 525/68

FOREIGN PATENT DOCUMENTS
| JP | 7-70334 A | | 3/1995 |
| JP | 8-197640 | * | 8/1996 |
| JP | 8-197640 A | | 8/1996 |

* cited by examiner

*Primary Examiner* — David W Wu
*Assistant Examiner* — Sonya Wright
(74) *Attorney, Agent, or Firm* — Sughrue Mion, PLLC

(57) ABSTRACT

Provided is a resin article containing a propylene resin having a crystalline phase and a non-crystalline phase, wherein the propylene resin shows, in its scattering profile measured at a temperature of 155° C. to 165° C. by small-angle X-ray scattering method, a plurality of scattering peaks. This resin article can be produced by a method including a step of shaping a propylene resin containing a polypropylene having an intrinsic viscosity of 6.0 dl/g or more in an amount of 5% by weight to 40% by weight to produce an article precursor, and a step of heating the article precursor at 150° C. to 170° C.

4 Claims, 6 Drawing Sheets

RESIN ARTICLE AND PROCESS FOR PRODUCING THE SAME

TECHNICAL FIELD

The present invention relates to a resin article made of a propylene resin, and a method for producing the same. Particularly, the invention relates to a resin article which is excellent in rigidity and impact strength and a method for producing the same.

BACKGROUND ART

Propylene resin articles have been used in various fields as industrial materials for automotive components, components of household electric appliances, and so on. For example, to improve rigidity, surface hardness, heat resistance, etc., JP 7-292022 A discloses a propylene-based polymer characterized in that the polymer has a content of xylene-insolubles of 99.0% by weight or more, an isotactic pentad fraction of 98.0% or more and an isotactic average chain length of 500 or more, and that the total content of all fractions obtained by column fractionation of the xylene-insolubles and having an average chain length of 800 or more is 10% by weight or more.

However, there has been a demand for further improvement in rigidity and impact strength of resin articles made of the propylene resin disclosed in JP 7-292022 A.

DISCLOSURE OF THE INVENTION

In light of the problem shown above, an object of the present invention is to provide a resin article excellent in rigidity and impact strength and a method for the production thereof.

The present inventors found that when a propylene resin constituting a resin article is caused to have such a structure that a plurality of long periods, each being a period of repetitive structure composed of a crystalline phase and a non-crystalline phase, the resin article can be improved in rigidity and strength and, as a result, they have accomplished the present invention.

The present invention is directed to a resin article composed of a propylene resin having a crystalline phase and non-crystalline phase, wherein the propylene resin shows, in its scattering profile measured at a temperature of 155° C. to 165° C. by small-angle, X-ray scattering method, a plurality of scattering peaks.

In addition, the present invention is also directed to a method for producing the above-mentioned resin article, comprising a step of shaping a propylene resin containing a polypropylene having an intrinsic viscosity of 6.0 dl/g or more in an amount of 5% by weight to 40% by weight to produce an article precursor, and a step of heating the article precursor at 150° C. to 170° C.

MODE FOR CARRYING OUT THE INVENTION

[Resin Article]

Figure 1:
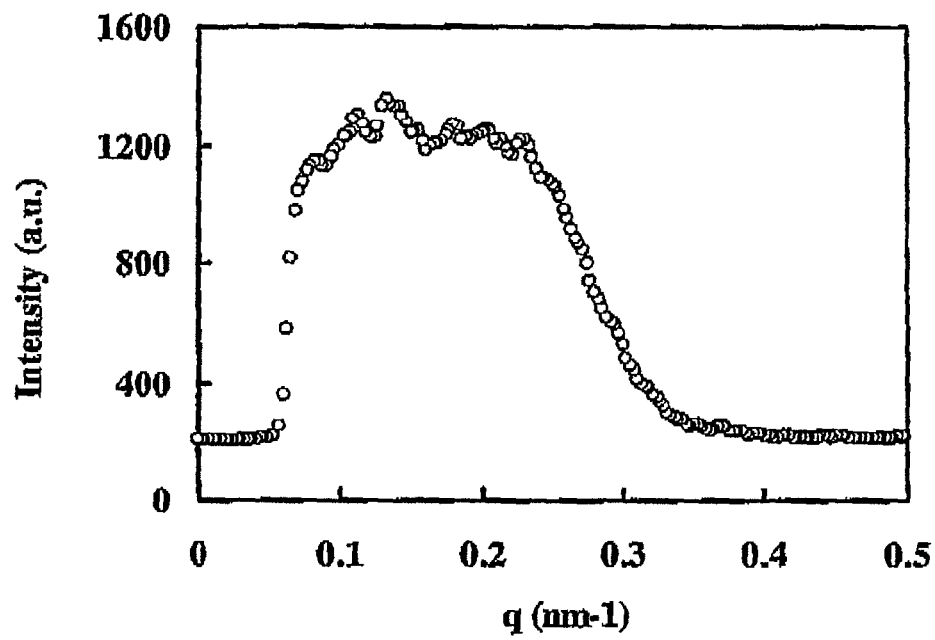
FIG. 1 shows the small-angle X-ray scattering profile obtained at 160° C. using the specimen of Example 1 of the present invention.

The resin article of the present invention is characterized by being made of a propylene resin having a crystalline phase and non-crystalline phase, wherein the propylene resin shows a plurality of scattering peaks in its scattering profile measured at a temperature of 155° C. to 165° C. by small angle X-ray scattering.

In resin articles made of a propylene resin which shows such a profile, a plurality of long periods, each being a period of repetitive structures of a crystalline phase and non-crystalline phase, are calculated. Forming a long period structure in which both a crystalline phase and a non-crystalline phase are thick makes it possible to improve resin articles in rigidity and impact strength than before. It is preferable that there be two peaks in the scattering profile. The long period (d) of a crystal structure can be determined by substituting a wave number (q) which corresponds to a scattering peak of a scattering profile (a scattering peak is referred hereinafter to as a "scattering vector") into a formula $d=2\pi/q$.

As used herein, the term "crystalline phase" refers to a portion which exists in the form of crystallites in a resin article. The term "non-crystalline phase" refers to a portion other than crystallites. The "scattering profile" is a diagram in which the scattering intensity measured by small angle X-ray scattering measurement as described later is expressed as a function of the scattering vector. The "scattering peak" is a peak obtained by approximating the aforesaid scattering profile with a Gaussian function.

It is preferable with the scattering profile that at least one scattering peak be present within a wave number range (i) of not less than $0.08\ nm^{-1}$ but less than $0.15\ nm^{-1}$ and at least one scattering peak be present within a wave number range (ii) of $0.15\ nm^{-1}$ to $0.30\ nm^{-1}$, and simultaneously that the ratio of a peak intensity (1) to a peak intensity (2) fall within the range of from 1 to 5 where the peak intensity (1) is the peak intensity of a scattering peak having the maximum intensity among the at least one scattering peaks in the wave number range (i) and the peak intensity (2) is the peak intensity of a scattering peak having the maximum intensity among the at least one scattering peaks in the wave number range (ii). A resin article having such a peak intensity ratio has been improved more in rigidity and impact strength. If the intensity ratio is less than 1, a resin article tends to be insufficient in impact strength. If the intensity ratio exceeds 5, the rigidity tends to be insufficient.

In the present invention, it is preferable that a small angle X-ray scattering apparatus composed of an optical system having a spatial resolution of 0.08 $nm^{-1}$, a heating device for heating a resin article, and an X-ray detector be used as a small angle X-ray scattering apparatus. It is preferable to use, for example, a small angle X-ray scattering apparatus in which a synchrotron radiation X-ray source disclosed in "Synchrotron Radiation Application Technology, published by Science Forum Inc., pages 177-183 (1989)" is used. A heating device that has a window which an X-ray passes through and that can increase the temperature at a rate of at least 1° C./min is used as the heating device for heating a resin article. Conmmercially available devices may be used as the heating device. The X-ray detector is an X-ray detector which can detect the scattered X-ray in the time resolution of milliseconds and preferably is a two-dimensional X-ray CCD detector which can two-dimensionally record the scattered ray. Commercially available devices may be used as the X-ray detector.

The small angle X-ray scattering preferably is measured by applying an X-ray to a resin article while heating the resin article from room temperature (for example, 25° C.) to a temperature at which the resin article melts (for example, 170° C. to 180° C.) at a fixed heating rate (for example, 1 to 10° C./min) and measuring an X-ray scattered from the resin article with an X-ray detector at fixed temperature intervals (for example, 1 to 5° C. intervals).

A scattering profile is obtained by plotting the measurements with the scattering intensity obtained by the above-mentioned measuring method as ordinate against the scattering angle or the scattering vector (q) defined as the difference in wave number vector of the incident wave and the scattered wave of an X-ray as abscissa. A long period can be calculated from the wave number of a scattering peak position determined by approximating the scattering profile with a Gaussian function. Commercially available numerical analysis software may be used.

The temperature of the small angle X-ray scattering measurement preferably is 155° C. to 165° C. If the measurement temperature is lower than 150° C., the observation accuracy of scattering peaks which exist in the wave number range (i) of not less than 0.08 $nm^{-1}$ but less than 0.15 $nm^{-1}$ may become insufficient. If the measurement temperature is higher than 165° C., the observation accuracy of scattering peaks which exist in the wave number range (ii) of not less than 0.15 $nm^{-1}$ but less than 0.30 $nm^{-1}$ may become insufficient. From the viewpoint of the prevention of a resin article from thermally degrading and the rate of heat conduction to a resin article, the temperature rising rate in the measurement preferably is 1° C. to 10° C., and more preferably 5° C. to 10° C. From the viewpoint of the accuracy of scattering peak observation, the intervals between temperatures at which the small angle X-ray scattering are measured preferably are 0.1° C. to 5° C., and more preferably are 0.1° C. to 1° C.

It is preferable with the scattering profile obtained in such a way that at least one scattering peak be present within a wave number range (i) of not less than 0.08 $nm^{-1}$ but less than 0.15 $nm^{-1}$ and at least one scattering peak be present within a wave number range (ii) of 0.15 $nm^{-1}$ to 0.30 $nm^{-1}$, and simultaneously that the ratio of a peak intensity (1) to a peak intensity (2) fall within the range of from 1 to 5, more preferably from 1 to 4.5, and even more preferably from 1 to 4, where the peak intensity (1) is the peak intensity of a scattering peak having the maximum intensity among the at least one scattering peak in the wave number range (i) and the peak intensity (2) is the peak intensity of a scattering peak having the maximum intensity among the at least one scattering peak in the wave number range (ii). It is preferable that both the number of the peak in the wave number range (i) and the number of the peak in the wave number range (ii) be one.

[Method for Producing a Resin Article]

The method for producing the resin article of the present invention has a step of producing an article precursor (henceforth, referred to also as a molding step), and a step of thermally treating the article precursor (henceforth, referred to also as a thermal treatment step).

The molding step is a step of molding a propylene resin containing a polypropylene having an intrinsic viscosity of 6.0 dl/g (henceforth, referred to as polypropylene A) in an amount of 5% by weight to 40% by weight of the total amount. The use of a propylene resin containing a polypropylene resin A makes it possible to produce a plurality of long periods, each of which is a period of repetitive structures of a crystalline phase and a non-crystalline phase of a resin article to be obtained. By forming such a resin article, it becomes possible to improve the resin article in rigidity and impact strength.

While the intrinsic viscosity [η] of the polypropylene A is 6.0 dl/g or more, it preferably is 6.5 dl/g or more, and more preferably is 6.7 dl/g from the viewpoint of improving the physical properties, especially rigidity. If the intrinsic viscosity is less than 6.0 dl/g, the impact strength of a resin article may be insufficient.

The content of the polypropylene A in the propylene resin is 5% by weight to 40% by weight, preferably is 7.5% by weight to 35.0% by weight, more preferable is 10% by weight to 30% by weight, and even more preferably is 12% by weight to 25.0% by weight, wherein the overall amount of the propylene resin is 100% by weight. If the content is less than 5% by weight, the impact strength of a resin article may be insufficient. If the content exceeds 40% by weight, a resin article may have a reduced rigidity.

It is preferable that the propylene resin further contain a polypropylene having an intrinsic viscosity of 4.5 dl/g or less (henceforth, referred to as a polypropylene B). By containing the polypropylene B, it becomes possible to improve a resin article in rigidity and impact strength. While the intrinsic viscosity of the polypropylene B is 4.5 dl/g or less as mentioned above, it preferably is 4.3 dl/g or less, and more preferably is 4.0 dl/g. If the intrinsic viscosity is greater than 4.5 dl/g, the effect of improving the impact strength may be insufficient.

The content of the polypropylene B in the propylene resin is 60% by weight to 95% by weight, preferably is 65% by weight to 92.5% by weight, more preferable is 70% by weight to 90% by weight, and even more preferably is 75% by weight to 87.5% by weight, wherein the overall amount of the propylene resin is 100% by weight.

The intrinsic viscosity of the propylene resin containing the polypropylene A and the polypropylene B preferably is 2.0 dl/g or more, more preferably is 2.5 dl/g more, and even more preferably is 3.0 dl/g or more.

The polypropylene A and the polypropylene B each may be either a homopolymer or a random polymer composed of propylene and at least one olefin selected from the group consisting of ethylene and α-olefins having 4 or more carbon atoms. In particular, they preferably are each a homopolymer.

Examples of the copolymer of propylene with at least one olefin selected from the group consisting of ethylene and α-olefins having 4 or more carbon atoms include propylene-based random copolymers made up of propylene and at least one olefin selected from the group consisting of ethylene and α-olefins having 4 or more carbon atoms and propylene-based block copolymers having propylene homopolymer portions and propylene-ethylene random copolymer portions.

From the viewpoint of increasing the rigidity, the heat resistance or the hardness of a resin article, the isotactic pentad fraction as measured by $^{13}$C-NMR, of the polypropylene A preferably is 0.94 or more. The isotactic pentad fraction is a fraction of propylene monomer units which are present at the center of an isotactic chain in the form of a pentad unit, in other words, the center of a chain in which five propylene monomer units are meso-bonded successively, in the polypropylene molecular chain as measured by a method reported in A. Zambelli et al., Macromolecules, 6, 925 (1973), namely, by a method using $^{13}$C-NMR. NMR absorption peaks are assigned according to the disclosure of Macromolecules, 8, 687 (1975). Specifically, an isotactic pentad fraction is obtained as an area fraction of mama peaks in the whole peak area of methyl carbon ranges of a $^{13}$C-NMR spectrum.

The molecular weight distribution, that is, the ratio of the weight-average molecular weight (Mw) to the number-average molecular weight (Mn), Mw/Mn, as determined by gel permeation chromatography (GPC) of the propylene resin containing the polypropylene A and the polypropylene B preferably is from 5.0 to 35.0, more preferably is from 5.5 to 30.0, and even more preferably 6.0 to 25.0.

The methods for producing the polypropylene A and the polypropylene B may be known polymerization methods using a polymerization catalysts, and examples include bulk polymerization, solution polymerization, slurry polymerization, and vapor phase polymerization. These polymerization methods may be conducted either in a batch system or in a continuous system. Any combinations thereof are also available.

Examples of such polymerization catalysts include catalyst systems composed of (a) solid catalyst component including magnesium, titanium, halogen and an electron donor as essential components, (b) an organoaluminum compound and (c) electron donating component. Examples of this type of catalyst include catalyst systems disclosed, for example, in JP 1-319508 A, JP 7-216017 A, and JP 10-212319 A.

The amounts of the solid catalyst component (a), the organoaluminum compound (b) and the electron donating component (c) used in the aforementioned polymerization processes and the method of feeding the catalyst components into polymerization vessels may be determined appropriately with reference to methods of using conventional catalysts. The polymerization temperature is typically from −30° C. to 300° C., and preferably from 20° C. to 180° C. The polymerization pressure is typically from normal pressure to 10 MPa, and preferably from 0.2 MPa to 5 MPa. Hydrogen, for example, may be used as a molecular weight controller for controlling the molecular weight and the intrinsic viscosity.

In the methods for producing the polypropylene A and the polypropylene B, prepolymerization may be carried out before polymerization (main polymerization) is carried out. The method of the prepolymerization may be, for example, a method by which polymerization is carried out in a slurry state using a solvent while feeding a small amount of propylene in the presence of a solid catalyst component (a) and an organoaluminum compound (b).

In the present invention, the polypropylene A and the polypropylene B may be produced simultaneously by performing polymerization in two steps. The method of producing them by the polymerization in two steps may be, for example, a method by which the polypropylene A is produced in the former step and the polypropylene B in produced in the latter stage.

The polypropylene A and the polypropylene B obtained in such a method are melt-kneaded to form a propylene resin, which is then shaped. The method of the melt-kneading may be, for example, a method by which a polypropylene A and a polypropylene B, which have been produced separately, are melt-kneaded by the use of a single screw extruder, a twin screw extruder, a Banbury mixer, a hot roll, etc. The kneading temperature is typically from 170° C. to 250° C., and the kneading time is typically from 1 minute to 20 minutes. The kneading of the components may be performed either simultaneously or separately. When the components are mixed separately, the order of kneading is not restricted particularly.

The propylene resin may, if necessary, contain resins other than the polypropylene A and the polypropylene B, and various additives. Examples of such resins other than the polypropylene resin and the polypropylene B include elastomers. Examples of such additives include antioxidants, UV absorbers, nucleating agents, inorganic fillers and organic fillers.

Injection molding is usually used for the shaping of the propylene resin. An injection molding machine having an injection machine and a mold is used for the injection molding. The propylene resin is brought into a substantially molten state in the injection machine and then is filled into a mold cavity at a specified injection pressure.

In the molding step, the propylene resin injected into the mold cavity may be pressurized and held at a specified pressure in order to obtain a resin article superior in rigidity and impact strength. The holding of pressure leads to increase in degree of molecular chain orientation of the polymers constituting the propylene resin, so that it becomes possible to form a long period structure in which both the crystalline phase and the non-crystalline phase are thick. As a result, it becomes possible to obtain a resin article which is more improved in rigidity and impact resistance.

The pressure applied in the pressure holding, which may vary depending upon the size of the mold cavity, preferably is 15% or more, more preferably 20% or more, and most preferably 30% or more of the maximum injection pressure P of the injection molding machine. The pressure holding time is preferably from 0.5 seconds to 60 seconds, and more preferably from 1 second to 50 seconds. The temperature of the mold during the pressure holding is preferably from 10° C. to 70° C., and more preferably from 20° C. to 60° C. While the method for measuring the pressure during the pressure holding varies depending on the shape of an intended molded article, the pressure is generally measured with a pressure gauge provided in the injection molding machine.

An article precursor obtained by such a method is converted into a resin article through a thermal treatment step in which thermal treatment is performed at 150° C. to 170° C. By performing such a heat treatment step, it becomes possible to form a crystal structure sufficiently having a long period structure in which both a crystalline phase and a non-crystalline phase of a propylene resin in a resin article are large in thickness, in other words, it becomes possible to make the ratio of the peak intensity (1) to the peak intensity (2) in the aforementioned scattering profile be 1 or more. As a result, it becomes possible to increase the rigidity and the impact resistance of a resulting resin article in a shorter time than before.

The thermally treating temperature in the thermal treatment step is 150° C. to 170° C., preferably is 150° C. to 165° C., and more preferably is 150° C. to 160° C. The thermally treating time preferably is 10 minutes to 400 hours, more preferably is 10 minutes to 300 hours, and even more preferably is 10 minutes to 200 hours. By adjusting the thermally treating temperature at 150° C. or higher, it becomes possible to increase mechanical properties, particularly rigidity. By adjusting the thermally treating temperature at 170° C. or lower, it becomes possible to stabilize the shape of a resulting resin article. By adjusting the thermally treating time at 10 minutes or longer, it becomes possible to increase mechanical properties, particularly impact strength. On the other hand, by adjusting the thermally treating time at 400 hours or shorter, it becomes possible to prevent a propylene resin from decomposing and to impart sufficient mechanical properties.

Examples of the thermally treating method include (1) a method which comprises heating a mold at a temperature of 150° C. to 170° C. directly without removing an article precursor from the mold, the article precursor having been produced in the mold, (2) a method which comprises bringing an article precursor into contact with a roll surface or a hot plate surface heated at a temperature of 150° C. to 170° C., (3) a method which comprises placing an article precursor in an oven filled with gas such as nitrogen, argon and the air heated at a temperature of 150° C. to 170° C., and (4) a method which comprises immersing an article precursor in a bath filled with an inert liquid such as silicone oil or water heated at a temperature of 150° C. to 170° C.

EXAMPLES

The present invention is further described with reference to Examples and Comparative Examples, but the scope of the invention is not limited thereto.

The methods for the physical property measurements and the productions of the propylene resins to be used in the present invention or resin articles of the present invention are shown below.

(1) Intrinsic Viscosity ([η], Unit: dl/g)

Reduced viscosities were measured at three concentrations of 0.1 g/dl, 0.2 g/dl and 0.5 g/dl with an Ubbelohde's viscometer at 135° C. using tetralin as a solvent. The intrinsic viscosity was calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated in zero.

(2) Flexural Modulus (Unit: MPa)

In accordance with ASTM D790, an elastic modulus at 23° C. was measured by the use of a 3.2 mm thick specimen produced by injection molding.

(3) IZOD Impact Strength (Unit: kJ/cm$^2$)

In accordance with JIS K7110, an IZOD impact strength at 23° C. was measured by the use of a 3.2 mm thick specimen produced by injection molding and then notching.

(4) Small Angle X-ray Scattering Measurement (4-1) Setup of a Small Angle X-ray Scattering Measuring Apparatus The optical system of the small angle X-ray scattering measuring apparatus had a structure that a device for heating a resin article, a vacuum path, and a two-dimensional X-ray COD detector were disposed in order from the upstream, on a path of the beam. The heating device used was a heated shear flow applying unit (CSS-450NV) manufactured by Japan High Tech Co., Ltd., the unit having been designed for a small angle X-ray scattering apparatus. The two-dimensional X-ray CCD detector used was composed of an air-cooled two-dimensional X-ray CCD detector (C7300) manufactured by Hamamatsu Photonics K.K., and an image intensifier. On the position that a beam propagates the side face of the vacuum path which faced the two-dimensional X-ray CCD detector, a beamstop of 10 mm in diameter made of lead was disposed.

(4-2) Conditions of Small Angle X-ray Scattering Measurement

A resin article was placed in the heating device so that it might be in an arrangement suited for Through View measurement. Then, small angle X-ray scattering from the resin article was measured at an exposure time of 76 msec at every six seconds while the resin article was heated at a rate of 10° C./min until the resin article melted completely.

(4-3) Analysis of Small Angle X-ray Scattering Data

The scattering intensity of the small angle X-ray scattering detected with the two-dimensional X-ray CCD detector was analyzed using the software (commercial name: Hi-pic 6.3) attached to the detector. First, a background was obtained by measuring a small angle X-ray scattering derived from only the heated shear flow applying unit for the small angle X-ray scattering apparatus without placing any resin article. Next, a resin article was placed in the unit and the small angle X-ray scattering derived from the resin article placed in the unit was measured. Then, the small X-ray scattering measured was processed by subtracting the background therefrom. Furthermore, a scattering vector (q) at an arbitrary point on the two-dimensional image is determined from a small angle scattering pattern of a collagen having a known scattering angle, and then a scattering profile was produced by plotting the scattering intensity in the flow direction of the resin article in ordinate and the scattering vector in abscissa.

The long period in the resin article was calculated in the following procedures using numerical analysis software (commercial name: KaleidaGraph 4.0).

First, dung a process of heating the resin article at a rate of 10° C./min, a scattering profile at 160° C. to 161° C. in which the maximum of a scattering peak intensity was observed in each of a scattering vector range of not less than 0.08 nm$^{-1}$ but less than 0.15 nm$^{-1}$ and a scattering vector range of not less than 0.15 nm$^{-1}$ but less than 0.30 nm$^{-1}$ and in which the scattering intensity in the scattering vector range of not less than 0.08 nm$^{-1}$ but less than 0.15 nm$^{-1}$ was the greatest was approximated using the Gaussian function shown below, thereby determining parameters (m1-m6) of the scattering profile:

$$y = m1 + m2 \times \exp\{-((x-m3)/m4)^2\} + m5 \times \exp\{-((x-m6)/m4)^2\}$$

In the formula, m1 is a constant, parameter m3 is a scattering vector (q) corresponding to the wave number range (i) (not less than 0.08 nm$^{-1}$ but less than 0.15 nm$^{-1}$) and parameter m6 is a scattering vector corresponding to the wave number range (ii) (not less than 0.15 nm$^{-1}$ but less than 0.30 nm$^{-1}$). Parameters m2 and m5 are a peak intensity (1) and a peak intensity (2), and parameter m4 is a half-width of the Gaussian function. The long period (d) was calculated from the values of m3 and m6 by the use of a formula d=2π/q. The intensity ratio (peak intensity (1)/peak intensity (2)) was determined by the use of the values (m2 and m5) of the peak intensity (1) and the peak intensity (2) of scattering peaks.

(5) Method for Producing a Propylene Resin

Propylene resins were produced by the use of a catalyst disclosed in JP 10-212319 A. Propylene-ethylene copolymer (PP-1) and propylene homopolymer (PP-2) given below were used.

PP-1: propylene-ethylene copolymer having an intrinsic viscosity of 2.9 dl/g, an ethylene content of 0.3% by weight and an isotactic pentad fraction of 0.965.

PP-2: propylene homopolymer having an intrinsic viscosity of 7.0 dl/g.

(6) Thermal Treatment

Thermal treatment was conducted by placing a specimen in a stainless steal container of 20 cm in length, 20 mm in width and 2 cm in height put in a gear oven and sealing the container with a stainless steal plate of 22 cm in length, 22 cm in width and 0.5 cm in thickness.

Example 1

A pellet-shaped propylene resin was obtained by melt-kneading a mixture of 90 parts by weight of PP-1 and 10 parts by weight of PP-2 by the use of a single screw extruder of 40 mm in an inner diameter. The propylene resin was shaped into a specimen by the use of an injection molding machine (IS100EN manufactured by Toshiba Machine Co., Ltd.) adjusted at a cylinder temperature of 260° C. and at a holding pressure which was as high as 33% of the maximum injection pressure of the injection molding machine. The specimen was thermally treated by the use of a gear oven under the conditions given in Table 1. Using the specimen after the thermal treatment, the flexural modulus and the IZOD impact strength were measured. These results are shown in Table 1.

Figure 2:
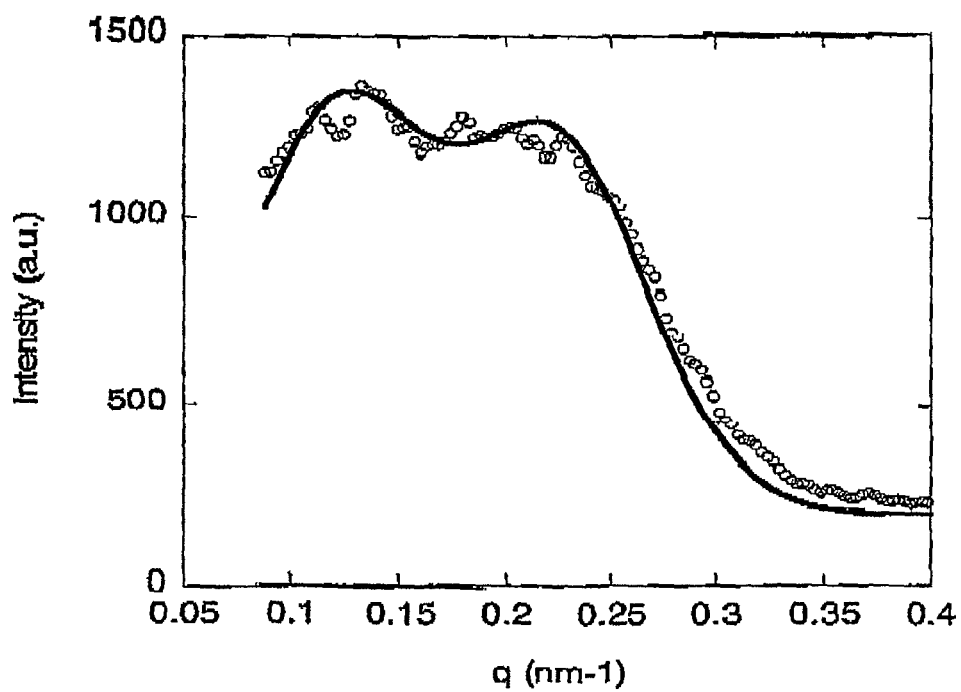
FIG. 2 is a diagram showing the result of an analysis of the small-angle X-ray scattering profile obtained at 160° C. using the specimen of Example 1 of the present invention.

Moreover, parameters m1 to m6, a long period, a maximum intensity and an intensity ratio were determined by producing a scattering profile on the basis of a small angle X-ray scattering measurement and approximating it with a Gaussian function. The scattering profile is shown in FIG. 1 and the analysis results of the scattering profile are shown in Table 2 and FIG. 2.

Example 2

Figure 3:
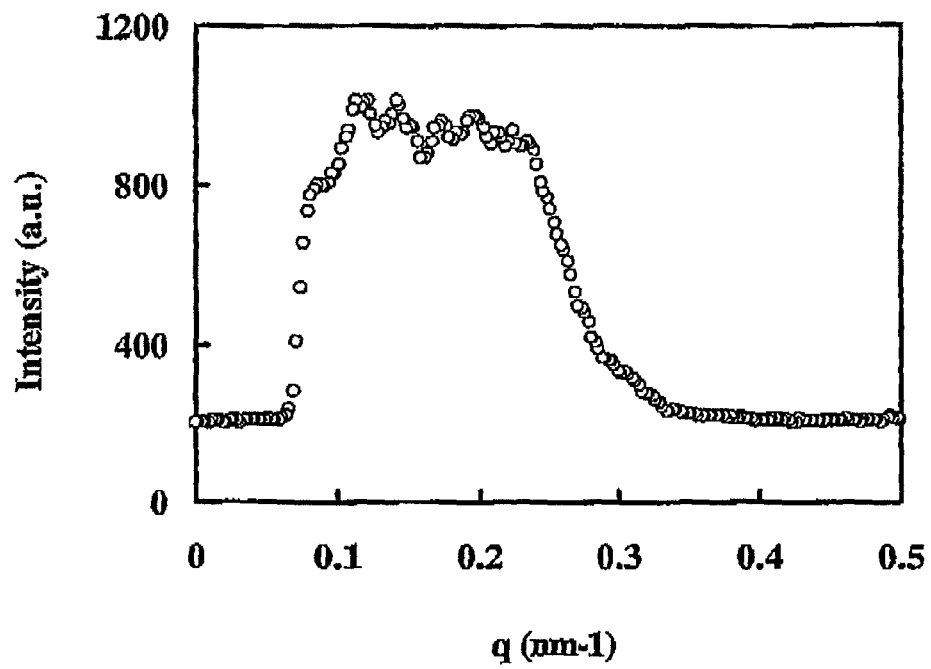
FIG. 3 shows a small-angle X-ray scattering profile obtained at 160° C. using the specimen of Example 2 of the present invention.
Figure 4:
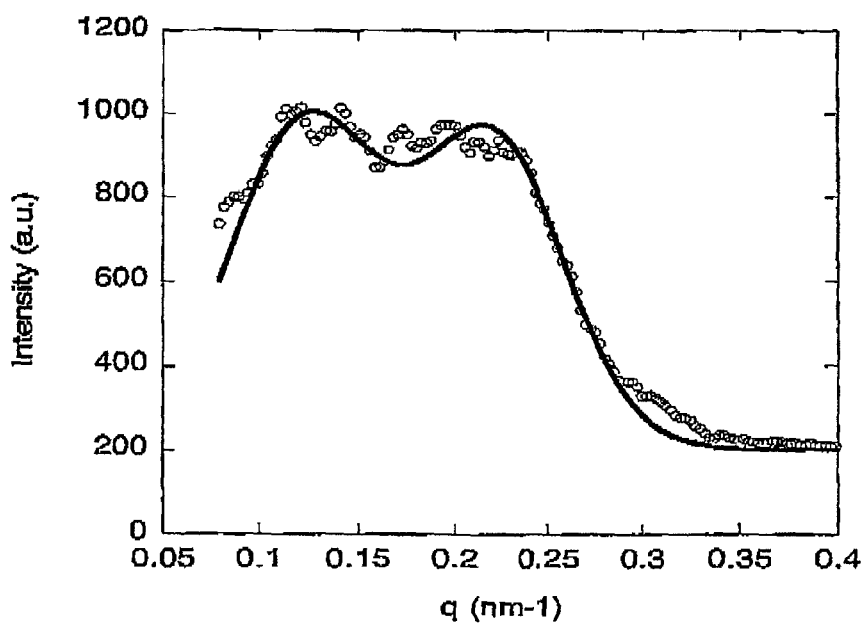
FIG. 4 is a diagram showing the result of an analysis of the small-angle X-ray scattering profile obtained at 160° C. using the specimen of Example 2 of the present invention.

Operations were carried out in the same manner as that described in Example 1 except for injection molding a propylene resin prepared by mixing 70 parts by weight of PP-1 and 30 parts by weight of PP-2 and performing thermal treatment under the conditions given in Table 1. The flexural modulus and the IZOD impact strength were shown in Table 1. The scattering profile is shown in FIG. 3 and the analysis results of the scattering profile are shown in Table 2 and FIG. 4.

Comparative Example 1

Figure 5:
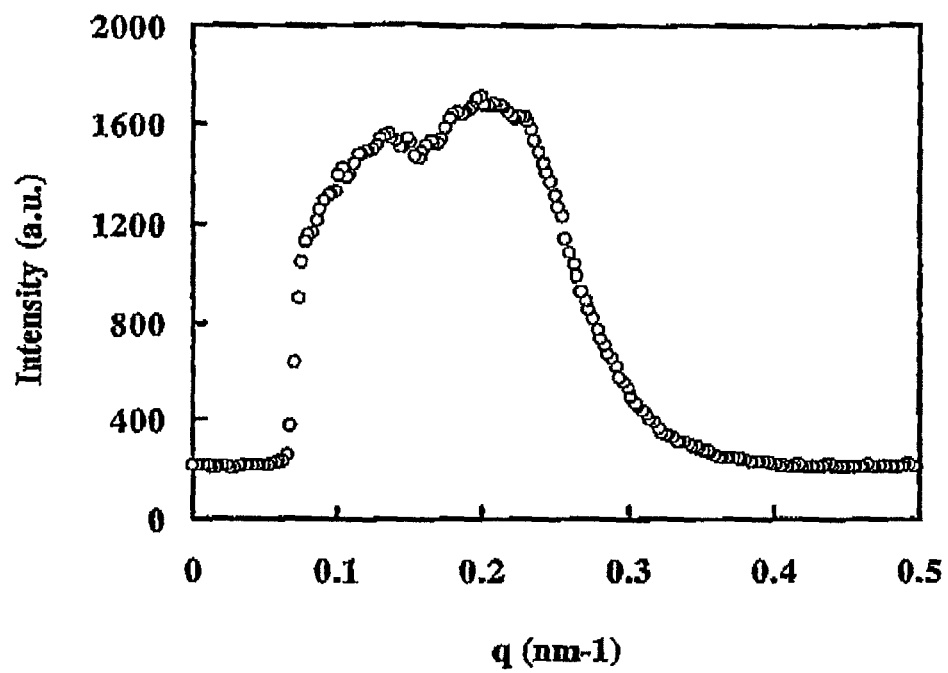
FIG. 5 shows the small-angle X-ray scattering profile obtained at 160° C. using the specimen of Comparative Example 1.
Figure 6:
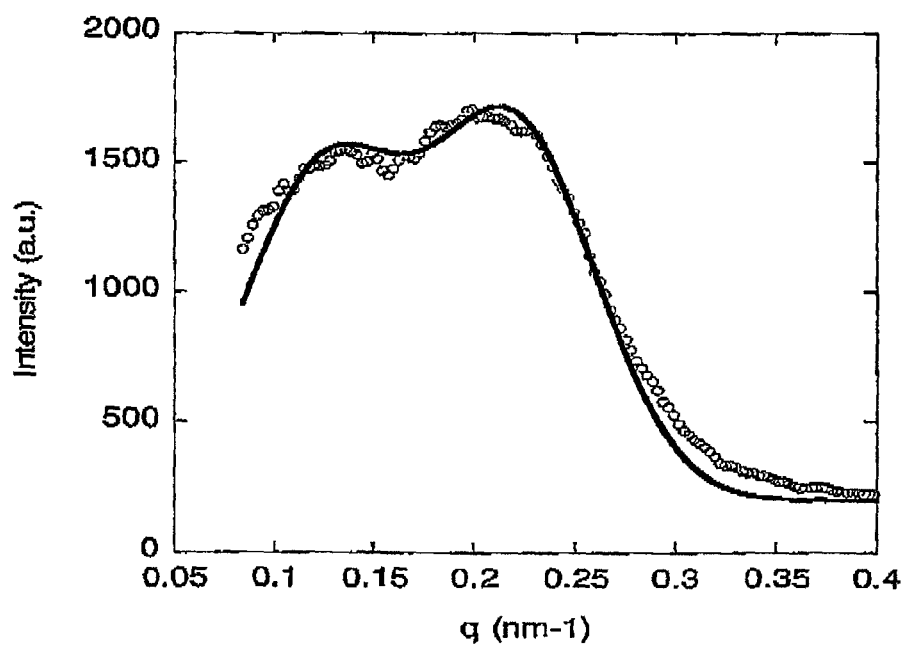
FIG. 6 is a diagram showing the result of an analysis of the small-angle X-ray scattering profile obtained at 160° C. using the specimen of Comparative Example 1.

Operations were carried out in the same manner as that described in Example 1 except for injection molding a propylene resin prepared by mixing 90 parts by weight of PP-1 and 10 parts by weight of PP-2 and performing thermal treatment under the conditions given in Table 1. The flexural modulus and the IZOD impact strength were shown in Table 1. The scattering profile is shown in FIG. 5 and the analysis results of the scattering profile are shown in Table 2 and FIG. 6.

Comparative Example 2

Figure 7:
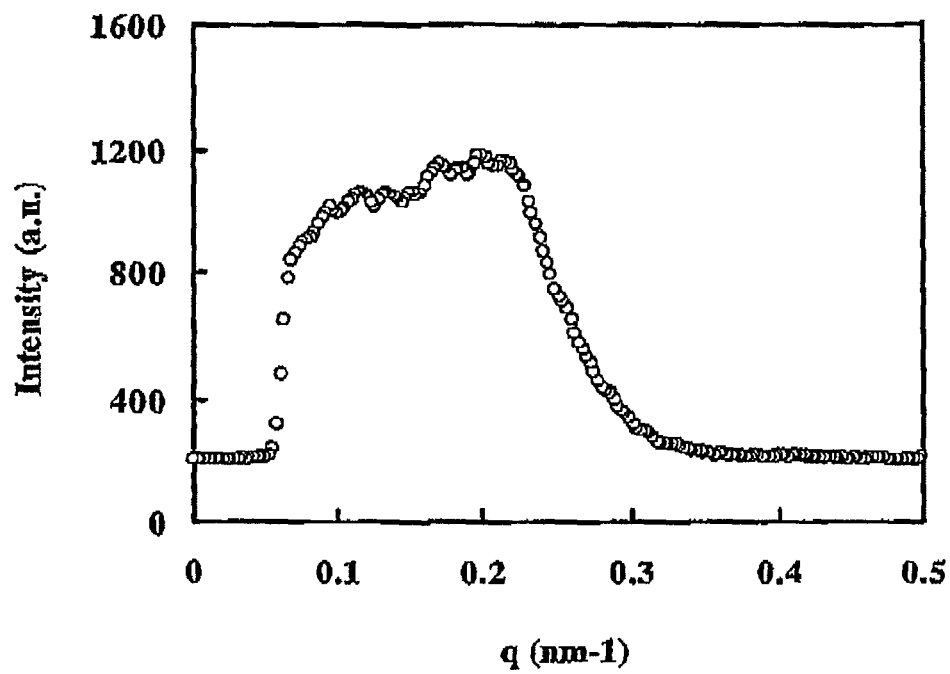
FIG. 7 shows the small-angle X-ray scattering profile obtained at 160° C. using the specimen of Comparative Example 2.
Figure 8:
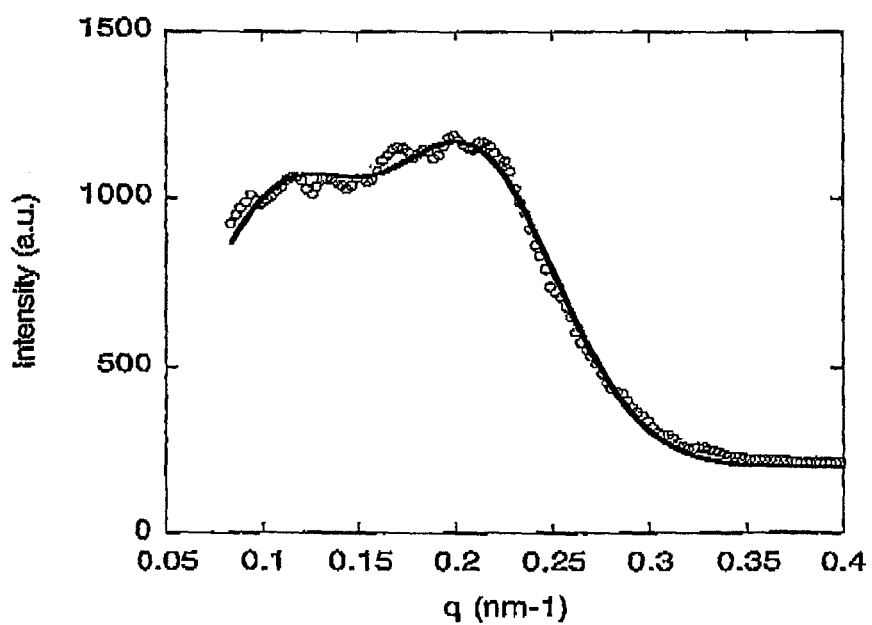
FIG. 8 is a diagram showing the result of an analysis of the small-angle X-ray scattering profile obtained at 160° C. using the specimen of Comparative Example 2.

Operations were cared out in the same manner as that described in Example 1 except for injection molding a propylene resin prepared by mixing 70 parts by weight of PP-1 and 30 parts by weight of PP-2 and performing thermal treatment under the conditions given in Table 1. The flexural modulus and the IZOD impact strength were shown in Table 1. The scattering profile is shown in FIG. 7 and the analysis results of the scattering profile are shown in Table 2 and FIG. 8.

Comparative Example 3

Figure 9:
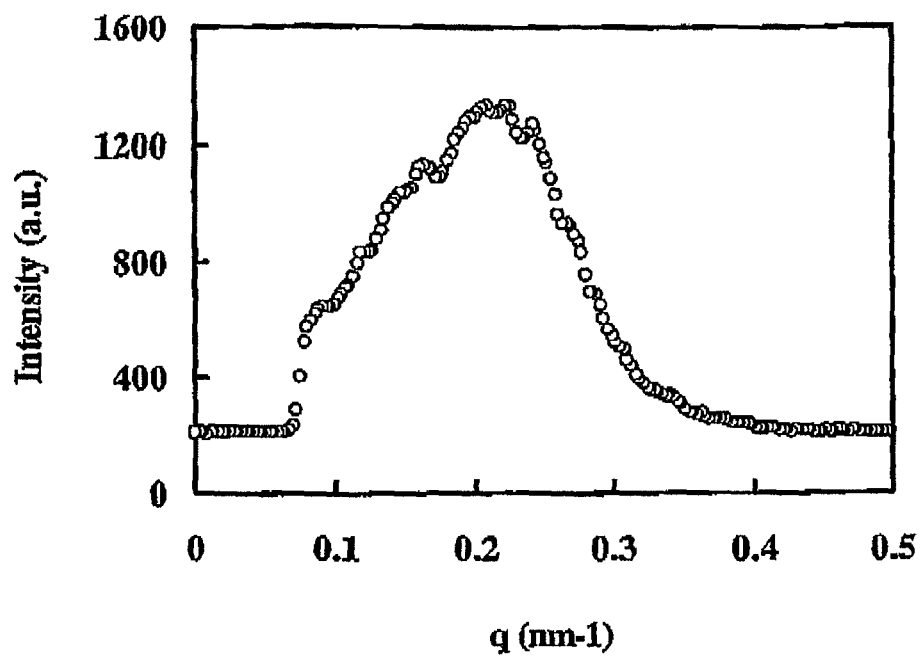
FIG. 9 shows the small-angle X-ray scattering profile obtained at 161° C. using the specimen of Comparative Example 3.
Figure 10:
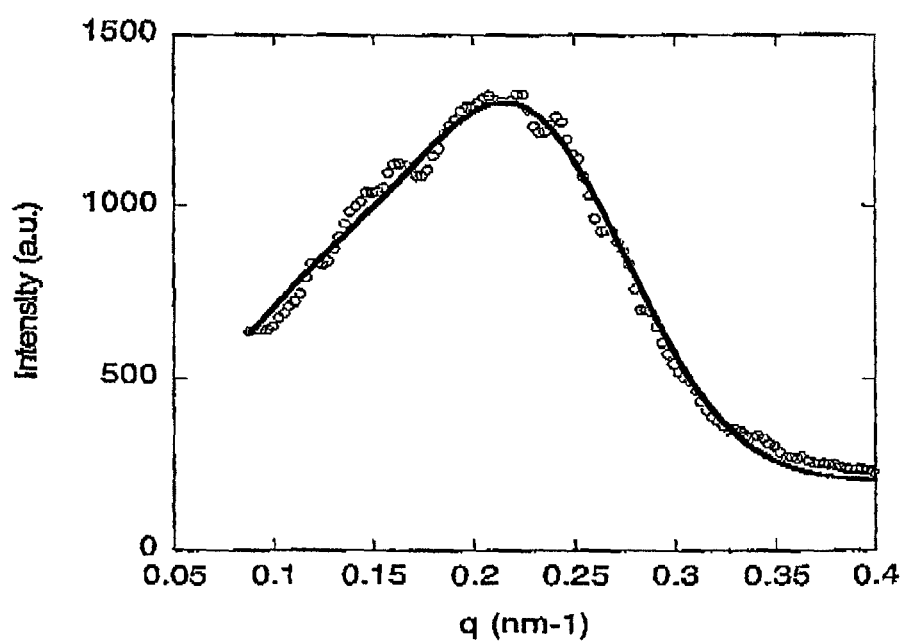
FIG. 10 is a diagram showing the result of an analysis of the small-angle X-ray scattering profile obtained at 161° C. using the specimen of Comparative Example 3.

Operations were carried out in the same manner as that described in Example 1 except for injection molding only PP-1 and performing thermal treatment under the conditions given in Table 1. The flexural modulus and the IZOD impact strength were shown in Table 1. The scattering profile is shown in FIG. 9 and the analysis results of the scattering profile are shown in Table 2 and FIG. 10.

Comparative Example 4

Figure 11:
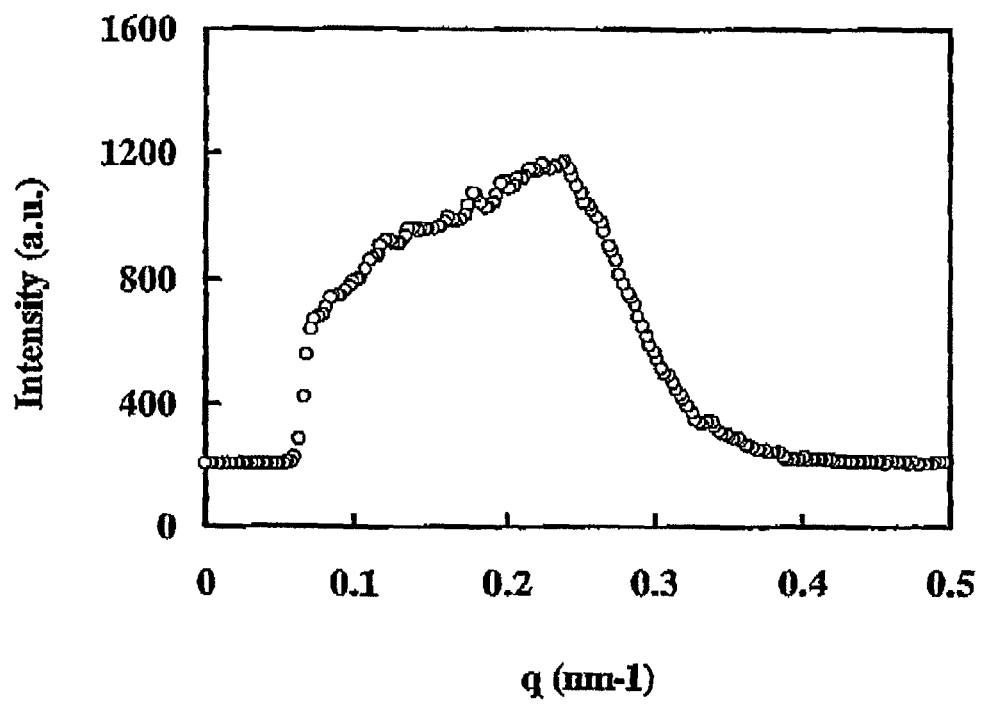
FIG. 11 shows the small-angle X-ray scattering profile obtained at 161° C. using the specimen of Comparative Example 4.
Figure 12:
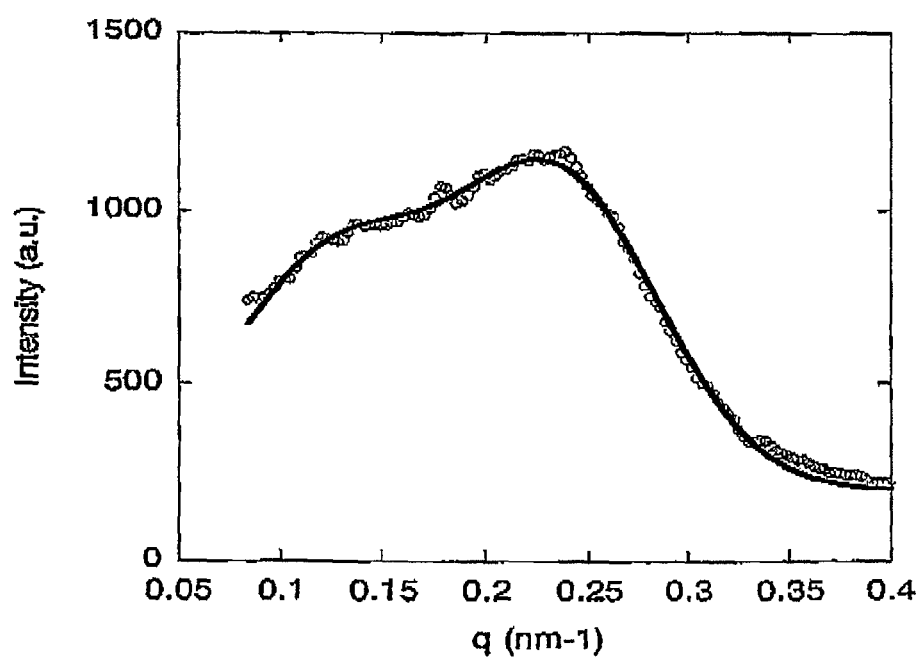
FIG. 12 is a diagram showing the result of an analysis of the small-angle X-ray scattering profile obtained at 161° C. using the specimen of Comparative Example 4.

Operations were carried out in the same manner as that described in Example 1 except for injection molding only PP-1 and performing thermal treatment under the conditions given in Table 1. The flexural modulus and the IZOD impact strength were shown in Table 1. The scattering profile is shown in FIG. 11 and the analysis results of the scattering profile are shown in Table 2 and FIG. 12.

TABLE 1

|  | Example | | Comparative Example | | | |
| --- | --- | --- | --- | --- | --- | --- |
|  | 1 | 2 | 1 | 2 | 3 | 4 |
| Compositional ratio | 90/10 | 70/30 | 90/10 | 70/30 | 100/0 | 100/0 |
| Thermal treatment temperature (° C.) | 155.0 | 155.0 | — | — | — | 155.0 |
| Thermal treatment time (min) | 30 | 30 | — | — | — | 30 |
| Flexural modulus (MPa) | 2500 | 2220 | 2090 | 2050 | 1720 | 1900 |
| IZOD impact strength (kJ/cm$^2$) | 52.0 | 50.8 | 7.9 | 7.6 | 5.1 | 38.9 |

TABLE 2

|  | Example | | Comparative Example | | | |
| --- | --- | --- | --- | --- | --- | --- |
|  | 1 | 2 | 1 | 2 | 3 | 4 |
| m1 (a.u.) | 200 | 200 | 200 | 200 | 200 | 200 |
| m2 (a.u.) | 1077 | 772 | 1249 | 779 | 409 | 642 |
| m3 (nm$^{-1}$) | 0.121 | 0.123 | 0.125 | 0.110 | 0.123 | 0.125 |
| m4 (—) | 0.0613 | 0.0540 | 0.0574 | 0.0618 | 0.0743 | 0.0707 |

TABLE 2-continued

|  | Example | | Comparative Example | | | |
| --- | --- | --- | --- | --- | --- | --- |
|  | 1 | 2 | 1 | 2 | 3 | 4 |
| m5 (a.u.) | 991 | 738 | 1420 | 897 | 1018 | 878 |
| m6 (nm$^{-1}$) | 0.225 | 0.220 | 0.220 | 0.210 | 0.225 | 0.235 |
| Long period (1) (nm) | 51.9 | 51.1 | 50.2 | 57.1 | 51.1 | 50.2 |
| Long period (2) (nm) | 27.9 | 28.5 | 28.5 | 31.4 | 29.9 | 26.7 |
| Intensity (1)/intensity (2) (−) | 1.09 | 1.05 | 0.88 | 0.87 | 0.40 | 0.73 |

INDUSTRIAL APPLICABILITY

According to the present invention, a resin article which is excellent in rigidity and impact strength and a method for producing the same are provided. This makes it possible to efficiently produce resin articles which are useful as industrial materials such as automotive materials.

The invention claimed is:

1. A resin article comprising a propylene resin having a crystalline phase and a non-crystalline phase, wherein the propylene resin shows, in its scattering profile measured at a temperature of 155° C. to 165° C. by small-angle X-ray scattering method, a plurality of scattering peaks, and the propylene resin contains a polypropylene having an intrinsic viscosity of 6.0 dl/g or more in an amount of 5% by weight to 40% by weight relative to the overall amount of the propylene resin.

2. The resin article of claim 1, wherein in the scattering profile, at least one scattering peak is present within a wave number range (i) of not less than 0.08 nm$^{-1}$ but less than 0.15 nm$^{-1}$ and at least one scattering peak is present within a wave number range (ii) of 0.15 nm$^{-1}$ to 0.30 nm$^{-1}$, wherein the ratio of a peak intensity (1) to a peak intensity (2) falls within the range of from 1 to 5 where the peak intensity (1) is the peak intensity of a scattering peak having the maximum intensity among the at least one scattering peaks in the wave number range (i) and the peak intensity (2) is the peak intensity of a scattering peak having the maximum intensity among the at least one scattering peaks in the wave number range (ii).

3. The resin article of claim 1, the propylene resin further contains a polypropylene having an intrinsic viscosity of 4.5 dl/g or less in an amount of 60% by weight to 95% by weight relative to the overall amount of the propylene resin.

4. A method for producing the resin article of claim 1, comprising a step of shaping a propylene resin containing a polypropylene having an intrinsic viscosity of 6.0 dl/g or more in an amount of 5% by weight to 40% by weight to produce an article precursor, and a step of heating the article precursor at 150° C. to 170° C.

* * * * *